Aug. 27, 1935.  G. U. PLANTA  2,012,479
DEVICE FOR DETECTING METALS, ETC
Filed Feb. 13, 1933
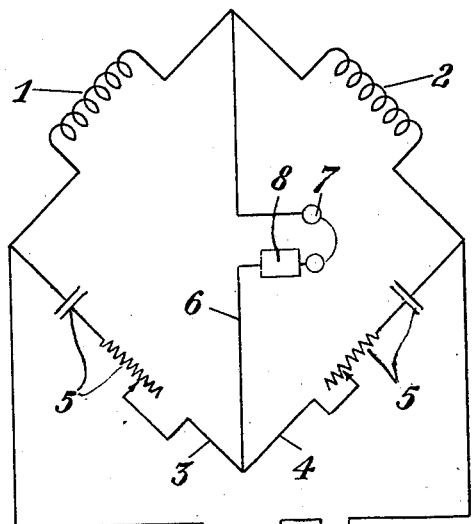
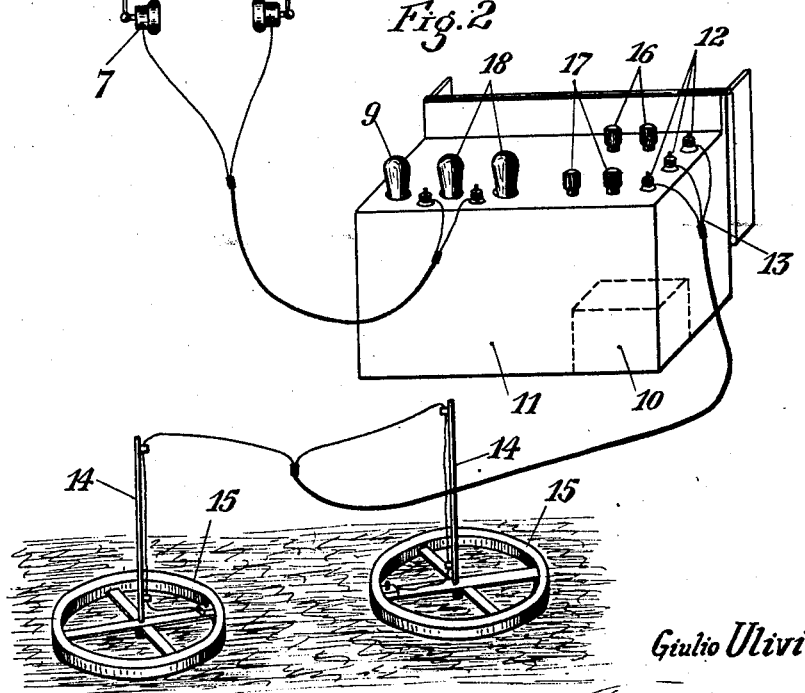
Inventor:
Giulio Ulivi Planta
Attorney:

Patented Aug. 27, 1935

2,012,479

UNITED STATES PATENT OFFICE 2,012,479

DEVICE FOR DETECTING METALS, ETC.

Giulio Ulivi Planta, Brussels, Belgium

Application February 13, 1933, Serial No. 656,597
In Belgium January 20, 1933

1 Claim. (Cl. 175—182)

This invention has for its object a process of and devices for detecting metals, metal objects, ores, and minerals, for instance deposits of ores, buried, submerged or floating metal objects, etc.

For performing the above stated object, it has been proposed to use the effects of electro-magnetic induction in a single or in several coils, fed with pulsating or with alternating current and displaced over the area to be searched or prospected. For instance one coil, constituting a primary circuit, creates a varying electro-magnetic field; a second coil, constituting a secondary circuit, is connected to a detecting device such as a telephone; the two coils are adjusted reciprocally in a neutral area so that no sound is heard in the telephone. Then by displacing the system thus adjusted, any metallic mass in the vicinity produces in the electro-magnetic field a change that induces in the secondary circuit, a current detected by the telephone or other means. Or a single coil is connected to a source of alternating current of audio frequency and, through a differential transformer, to amplifiers and to a telephone. The magnetic field emanating from the said coil induces in the masses of metal reached by said field, eddy currents which react upon the emitting circuit and create therein disturbances which are amplified and detected.

Another process has consisted in sending continuous or alternating current in the ground and measuring the electro-magnetic field thus produced, but this method is influenced by the natural earth currents and electro-magnetic fields.

The present invention is based upon the method of producing from an electrically and electro-magnetically equilibrated circuit and in the area to be prospected, an emission of ether or Hertz waves which are unaffected by electrical and earth currents and which, when encountering a metal, an ore, a metallic mass, etc., induce therein Foucault currents which react on the said equilibrated circuit and destroy the equilibrium thereof.

In the way of a device for putting the above process in practice, I constitute an electrically or electro-magnetically equilibrated system, which may be for instance a Wheatstone bridge, two sides of which will consist of adjustable capacities and resistances and the two others of solenoids or coils; the diagonal of the bridge consisting of a galvanometer, a telephone or any other current-detecting instrument. A valve, connected to a portable source of electrical current, is connected to both solenoids or coils in such a manner as to generate a modulated current and thereby emit from the solenoids or coils ether waves. By means of the adjustable capacities and resistances I am able to establish a stable equilibrium in the system or Wheatstone bridge, for a neutral ground, i. e. containing no metals. If the device thus equilibrated is carried in some place wherein the ether waves can be directed towards a metal or metallic mass, the detecting instrument such as the telephone connected to amplifiers, will immediately signalize the existence of the said metal or metallic mass.

I will now have reference to the appended drawing, which shows a form of realization of the invention by means of a Wheatstone bridge and in which:

Fig. 1 is a schematic view of the connections,

Fig. 2 is a schematic view of the apparatus.

I have designated by numerals 1 and 2 two insulated windings or solenoids which constitute two sides of a Wheatstone bridge; the two other sides of which, designated by 3 and 4, contain adjustable resistances and capacities 5, whereas the diagonal 6 of the bridge passes through a telephone ear-piece 7, in which the current will be reinforced by an amplifier 8. 9 is a valve, fed by a source of current 10, and producing a modulated current.

The mounting of the Wheatstone bridge is evidently given by way of example, any other electrically or electro-magnetically equilibrated system being suitable. Practically the apparatus is mounted in an insulated case 11 (Fig. 2) containing also the source of current 10. This case carries externally the terminals 12 from which wires 13 lead to the coils or solenoids 1, 2. The latter are in the shape of flat windings carried by a central insulating rod 14 on a cross 15 to allow displacement of the coils. The case 11 carries the terminals of the telephone ear-pieces 7, and the knobs 16, 17 for adjusting respectively the capacities and the resistances. It may also be provided with all the other usual apparatus or instruments for verification. 18 designates the valves of the receiving system.

If it is intended, for instance, to prospect a ground with the object of finding buried engines of war, the apparatus is first equilibrated in such a manner that on a neutral soil (containing no metals at the depths contemplated and for which the modulated current and the modulation thereof have been regulated) the ear-pieces 7 give no sound; then the windings 1 and 2 or only one of them, are carried over the ground to be prospected. As soon as one approaches to a spot under which there is, inside the limit of depth for which the modulating current has been regulated, a metal object, the ear-pieces 7 begin to vibrate, and the sound will become maximum when the operator will be exactly in the vertical axis over the buried metal object.

The process and the apparatus may receive very numerous applications, for instance, in archæological researches, for exactly locating metal objects and therefore buried monuments, for finding deposits of ore, submarine wrecks, sunken or buried cables, etc., the detection of buried or sunken metal bodies having been made as specified above, the location thereof may be found out trigonometrically, solving a triangle the base of which is known (distance between the solenoids) and the two adjacent angles are also known, being determined between the said base and the axis of the flux of ether waves emitted from each solenoid for obtaining no sound in the ear-pieces.

It will be pointed out that the apparatus according to this invention does not require the use of sounding-rods to be placed in the ground, nor of electrodes; the solenoids must be displaced over the ground but must not come into contact with the ground. No electric current is sent into the ground as in known processes, and by the fact that ether waves are utilized, only a very small power of emitting current is required; therefore the apparatus is comparatively small; the case 11 and all the accessories may be carried with a shoulder-belt. The process will allow to detect for instance a small plate of any metal having 100 square cm. at two meters under the ground by means of an emitting current of one milliwatt.

Having now fully described my said invention, what I claim and desire to secure by Letters Patent, is:

A portable apparatus for detecting hidden metals, metal objects, and ores, comprising in combination a Wheatstone bridge constituting the electrical detecting circuit, and two flat bobbins, forming two sides of said Wheatstone bridge, and independently displaceable in the area to be prospected, the two other sides of said Wheatstone bridge comprising means for adjusting the electrical circuit in a state of equilibrium, a source of current connected to the outer terminals of said bridge and adapted to produce an emission of ether waves from said flat bobbins, and means connected in diagonal in the bridge to detect reaction produced by said ether waves reaching a metallic mass.

GIULIO ULIVI PLANTA.